United States Patent
Maddury et al.

(10) Patent No.: US 7,187,770 B1
(45) Date of Patent: *Mar. 6, 2007

(54) METHOD AND APPARATUS FOR ACCELERATING PRELIMINARY OPERATIONS FOR CRYPTOGRAPHIC PROCESSING

(75) Inventors: Mahesh S. Maddury, Santa Clara, CA (US); Kenneth J. Tomei, Sunnyvale, CA (US); Justina Provine, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 880 days.

This patent is subject to a terminal disclaimer.

(21) Appl. No.: 10/196,829

(22) Filed: Jul. 16, 2002

(51) Int. Cl.
*H04K 1/00* (2006.01)
*G06F 17/00* (2006.01)

(52) U.S. Cl. .......................... 380/28; 708/490
(58) Field of Classification Search ............... None
See application file for complete search history.

(56) References Cited

U.S. PATENT DOCUMENTS

| | | | |
|---|---|---|---|
| 5,321,752 A * | 6/1994 | Iwamura et al. ........... 713/174 |
| 6,088,453 A * | 7/2000 | Shimbo .................... 380/28 |
| 6,240,436 B1 * | 5/2001 | McGregor ................. 708/491 |
| 6,356,636 B1 * | 3/2002 | Foster et al. ............. 380/30 |
| 6,546,104 B1 * | 4/2003 | Shimbo et al. ............ 380/28 |
| 7,010,560 B2 * | 3/2006 | Shimbo .................... 708/491 |
| 7,024,560 B2 | 4/2006 | Asami |
| 7,111,032 B2 | 9/2006 | Horie |
| 7,117,237 B2 | 10/2006 | Amano et al. |
| 2002/0101984 A1 | 8/2002 | Asami |
| 2002/0126838 A1* | 9/2002 | Shimbo et al. ............ 380/28 |
| 2003/0033340 A1* | 2/2003 | Asami ..................... 708/491 |
| 2003/0182340 A1 | 9/2003 | Horie |
| 2004/0064274 A1* | 4/2004 | Yamaguchi .............. 702/60 |
| 2004/0167955 A1* | 8/2004 | Okumura ................. 708/620 |

OTHER PUBLICATIONS

Bruce Schneier, "Applied Cryptography," 1996, pp. 242-245 and 466-474.
"Appendices," describing mathematical theorems, Cisco Systems, Inc., 2002, (admitted prior art), 4 pages.

* cited by examiner

*Primary Examiner*—Christopher Revak
(74) *Attorney, Agent, or Firm*—Hickman Palermo Truong & Becker LLP

(57) ABSTRACT

A method and apparatus for cryptographic data processing, includes determining a first modulus having up to a first number of binary digits. A large integer is received which has up to a second number of binary digits that is greater than the first number of binary digits. The first modulus and the large integer are sent to a first processor for computing a first residue of the large integer modulo the first modulus. Before the first processor finishes computing the first residue, the first modulus is also sent to a second processor for computing a second residue of two raised to a power of twice the first number of binary digits modulo the first modulus. The first residue and the second residue are used as input to a third processor that computes a cryptographic result based on the large integer.

32 Claims, 8 Drawing Sheets

METHOD AND APPARATUS FOR ACCELERATING PRELIMINARY OPERATIONS FOR CRYPTOGRAPHIC PROCESSING

FIELD OF THE INVENTION

The present invention generally relates to cryptographic data processing. The invention relates more specifically to a method and apparatus for accelerating computation of Montgomery multiplication constants or modular reduction, or both, which are preliminary operations for widely used decryption methods.

BACKGROUND OF THE INVENTION

The security of many cryptographic algorithms lies in the mathematical difficulty in factoring large integer values (whole numbers with hundreds of decimal digits or more). Factoring a particular integer means determining the unique set of prime numbers that, multiplied together, form the particular integer. A prime number is a number that has as factors only the number itself and the number one.

Many cryptographic algorithms also employ modulo arithmetic in which intermediate and final results are expressed as an integer in the range from 0 to m−1 for a number m called a modulus. The modular reduction operation is here represented by the term "mod." The modular reduction operation has two parameters, the modulus m and an integer a, and one result, the integer b such that a=b+k*m for some integer k. Effectively, the output b of the modular reduction operation is the remainder, or residue, of dividing the input integer a by the modulus m. If a is less than m, then b is the same as a. The modular reduction operation is herein expressed as "a modulo m equals b" and written as a mod m=b Alternatively, this is expressed as "a is equivalent to b modulo m" and written as a≡b [mod m]

where [mod m] in square brackets indicates the immediately preceding number or variable is the output of the modulo operation. That is, the integer b always lies between 0 and m−1, whereas the integer a need not. The integer b is the residue of a modular reduction operation on the integer a and the modulus m. Other modular arithmetic operations commonly employed in cryptographic processing includes modular addition (the modular reduction of a sum of two integers), modular subtraction (the modular reduction of a difference between two integers), modular multiplication (the modular reduction of a product of two integers), modular division (the modular reduction of a quotient of a first integer divided by a second integer) and modular exponentiation (the modular reduction of a first integer raised to the power of a second integer).

Modular multiplication and exponentiation are often performed based on Montgomery's algorithm, well known in the art, and described in the article "Modular Multiplication without Trial Division," by P. L. Montgomery, in *Mathematics of Computation*, v 44, n. 170, 1985, pp. 519–521.

Cryptographic processing systems can be implemented in software, but speed is often significantly increased by implementing some of the steps in special purpose hardware such as electronic circuits. Such hardware typically takes the form of an application specific integrated circuit (ASIC), a "chip," which is composed of separate blocks of circuitry that each performs a certain combination of one or more steps of the computation. The blocks of circuitry are connected so that the output of one block is fed as input to another block. At many steps, a set of parallel connections between blocks is devoted to pass every binary digit (bit) of input and output during each processing cycle. Efficient, thoroughly tested, small footprint blocks have been developed for several modulo computations. Common circuit blocks employed in cryptographic processing systems include modular reduction (MR) blocks, modular addition (MA) blocks, modular subtraction (MS) blocks, modular multiplication (MM) blocks, modular division (MD) blocks and modular exponentiation (ME) blocks.

In designing and building circuits to perform cryptographic processing one often has to trade the size of the circuitry for latency. The size of the circuitry is often measured in number of fundamental components called gates. The latency is often measured in the number of processing cycles. A gate transforms an input set of one or more bits to an output set of one or more bits during each processing cycle. Chips with fewer gates that are reused in subsequent processing cycles require more processing cycles to complete processing and increase latency. Chips with more gates that can complete processing in fewer processing cycles are larger, cost more and consume more power than chips with fewer gates. As a consequence, there are many alternatives for the architecture of the individual blocks and the arrangement of multiple blocks in processing systems.

The number of gates on a block is also related to the maximum number of bits of the input to and output from the block during one processing cycle; the more bits the more gates. The blocks are usually designed for integers up to a certain maximum number of bits. For example, existing MR blocks use precision division or successive subtractions for a limited number of bits, typically 128 bits or fewer. The use of precision division or successive subtraction becomes unwieldy at larger input and modulus sizes, such as at 1024 bits and 2048 bits. The number of processing cycles used for successive subtractions increases with the difference between the number of bits for the large integer and the number of bits for the modulus. This difference can sometimes be quite large, on the order of 1000 bits.

For some cryptographic processing, the modular reduction is performed a few times on a very large integer with a number of bits much greater than existing MR blocks and more frequently on integers having a number of bits less than the maximum for existing MR blocks. An example cryptographic algorithm widely deployed is RSA invented by Rivest, Shamir and Adleman, and described in the reference *Applied Cryptography, Protocols, Algorithms, and Source Code in C*, by Bruce Schneier, 1996, John Wiley & Sons, New York (hereinafter referenced as Schneier). In this algorithm, the Chinese Remainder Theorem, well known in the art, is employed to break down a larger problem with a large modulus M, where M is equal to the product of two primes P1 and P2, into two smaller problems with the smaller moduli P1 and P2. The residue of large text T modulo P1, and the residue of T modulo P2, are needed (where T is the cipher text during decryption).

In current implementations, the smaller residues, e.g., T mod P1 and T mod P2, are used in subsequent processing steps that employ hardware designed to handle integers of the size of the residues, e.g., of the sizes of P1 or P2, but not of the size of the large integer, e.g., the size of T (also the size of M). Therefore the residues of the large texts are often computed in software and then passed as input to the hardware to continue the processing. The software computation of the residue is a performance hindrance.

Based on the foregoing, there is a clear need for an MR block that provides a smaller residue of a very large integer, which is not too costly in chip size and latency.

Furthermore, Montgomery multiplication modulo modulus m involves a factor called a Montgomery Constant that depends on m. In a past approach, the Montgomery Constant is computed in software for each modulus involved in the cryptographic processing and stored in one or more registers on the cryptographic processing chip. In the RSA algorithm, three moduli (M, P1, P2) are used for each private-key-public-key pair, so that three Montgomery Constants have to be determined for the three moduli and stored in three registers on the chip, consuming valuable chip area to support a large number of key pairs. Assuming use of 4,000 key pairs, which is reasonable for a practical implementation, the memory required to store the three Montgomery Constants (M, P1, P2) is approximately 12 megabits, excluding other pre-calculated constants.

Other cryptographic processing algorithms that compute Montgomery Constants include Diffie-Hellman key generation and the Digital Signature Algorithm (DSA), both well known in the art and described in Schneier. To support multiple key pairs, multiple sets of three registers can sometimes be involved, consuming even more valuable area on the chip. For example, in the Ephemeral Diffie-Hellman key pair generation algorithm, well known in the art, the moduli can possibly change for each secret key generation. In this algorithm, the constants cannot even be pre-computed at all, but are necessarily computed after initiation of each exchange sequence.

Based on the foregoing there is a clear need for computing Montgomery Constants as needed for Montgomery multiplication in MM and ME blocks, so that the number of registers on the chips to store Montgomery Constants can be reduced without excessively increasing latency.

Based on the foregoing, there is also a clear need for a cryptographic processing system that both computes Montgomery Constants as needed and provides hardware components for modular reduction of very large integers without excessively increasing latency.

The past approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent from the following description, are achieved in the present invention, which comprises, in one aspect, an apparatus for generating a digital output signal representing a modular reduction of a large integer. A first input receives a first input signal that represents a modulus having up to a first number of binary digits. A second input receives a second input signal that represents the large integer having up to a second number of binary digits that is greater than the first number of binary digits. A third input receives a third input signal that represents a constant based on a reciprocal of the modulus. A circuit is configured for generating an output signal representing a residue of the large integer modulo the modulus. The output signal is based on the first input signal and the second input signal and the third input signal. The circuit does not perform a division by the modulus, and does not consume a number of processing cycles as great as the first number of binary digits. An output presents the output signal that represents the residue.

According to another aspect of the invention, an apparatus for generating a digital output signal representing a residue of a particular power of two includes an input that receives input data that represents a modulus having up to a number of binary digits. A circuit is configured for determining the residue of two raised to a power of twice the number of binary digits modulo the modulus. An output presents the digital output signal representing the residue of two raised to the power of twice the number of binary digits. This signal represents the Montgomery Constant for the modulus.

According to another aspect of the invention, a method for generating a digital output signal representing a residue of a particular power of two includes receiving input data that represents a modulus having up to a number of binary digits. A first data element is initialized with data that represents two raised to a power of the number of binary digits. A difference is obtained by subtracting the modulus from a value represented by data in the first data element. It is determined whether the difference is negative. If it is determined that the difference is not negative, then data that represents the difference shifted toward more significant digits by one binary digit is placed into the first data element. Based on the data in the first data element, a digital output signal is provided that represents the residue of two raised to a power of twice the number of binary digits modulo the modulus. This output is the Montgomery Constant for the modulus.

According to another aspect, a method for cryptographic data processing includes determining a first modulus having up to a first number of binary digits. A large integer is received which has up to a second number of binary digits that is greater than the first number of binary digits. The first modulus and the large integer are sent to a first processor for computing a first residue of the large integer modulo the first modulus. Before the first processor finishes computing the first residue, the first modulus is sent to a second processor for computing a second residue of two raised to a power of twice the first number of binary digits. The second residue is the Montgomery Constant for the first modulus. The first residue and the second residue are used as input to a third processor that computes a cryptographic result based on the large integer.

In other aspects, the invention encompasses an apparatus and a computer readable medium configured to carry out the steps of the foregoing methods.

The apparatuses and methods of these aspects allow both Montgomery Constants and modular reduction of very large integers to be implemented in hardware that is operated in parallel, significantly decreasing the latency of cryptographic processing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
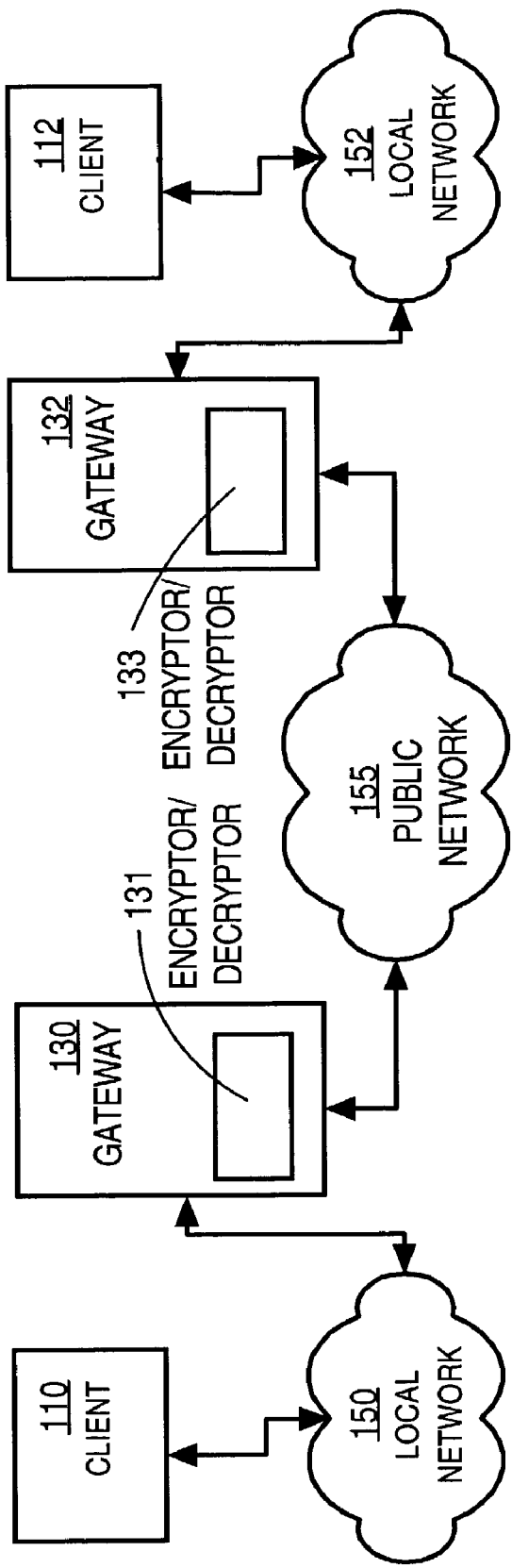
FIG. 1 is a block diagram that illustrates an overview of a cryptographic processing system, according to an embodiment.

A method and apparatus for accelerating preliminary operations for cryptographic processing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

| | |
|---|---|
| 1.0 | OPERATIONAL CONTEXT |
| 2.0 | STRUCTURAL OVERVIEW |
| 3.0 | FUNCTIONAL OVERVIEW |
| 4.0 | MONTGOMERY CONSTANT COMPUTATION |
| 5.0 | MODULAR REDUCTION COMPUTATION |
| 6.0 | MODULAR REDUCTION BLOCK |
| 7.0 | HARDWARE OVERVIEW |
| 8.0 | EXTENSIONS AND ALTERNATIVES |

1.0 Operational Context

To illustrate the modular arithmetic methods and apparatus, it is assumed that an electronic integrated circuit is fabricated for performing modular arithmetic operations to support RSA private key decryption. However, embodiments of the invention are not limited to this context, but may be employed in other contexts as well, such as public key-private key exchange, encryption, and decryption, and digital signatures. For example, embodiments may be used in processing systems, like RSA decryption, that employ either the Chinese Remainder Theorem (CRT) or modular exponentiation or modular multiplication or any combination of these. For example, embodiments may be employed as a means of designing such circuitry, as a software means for generating a Montgomery constant, as a hardware or software means of exchanging keys using Diffie-Hellman and ephemeral Diffie-Hellman, of verifying Digital Signature Algorithm (DSA) signatures, and of verifying RSA signatures.

The Digital Signature Algorithm (DSA) is a well-known digital signature algorithm promulgated by the National Institute of Standards and Technology (NIST). Diffie-Hellman is a well-known public-key private key exchange protocol. Both DSA and Diffie-Hellman are described in Schneier, referenced above. The DSA is used as the basis of the government Digital Signature Standard (DSS). Use of DSA is required in many popular network security protocols such as Secure Sockets Layer (SSL) and Internet security protocol (IPSec).

Both RSA and DSA employ public key cryptography techniques based on two keys known as a public key and a private key. The two keys are mathematically related, but the private key cannot be determined from the public key. In a system implementing public key technology, each party has its own public/private key pair. The public key can be known by anyone; however, no one should be able to modify it. The private key is kept secret. Its use should be controlled by its owner and it should be protected against modification as well as disclosure.

In general, in public key cryptography, a sender uses the recipient's public key to encrypt a plain text message; the resulting encrypted message is known as cipher text. The plain text may comprise data for text, voice, images, video, or any other data. The cipher text is sent to the recipient. The recipient can decrypt the message by providing the recipient's private key to a decryption algorithm that processes the message. Because deriving either party's private key from either party's public key is mathematically impractical, a malicious party cannot practically decrypt the message RSA decryption makes use of the numeric integer parameters E, D, P1, P2 and M. E is the public key published by the recipient of a message for use in encrypting plain text (X) to generate cipher text (C) to be sent to the recipient. D is the private key used by the recipient to decrypt the cipher text C and regenerate the plain text X. The parameters P1 and P2 are prime numbers whose product M is a modulus used on the cipher text C and plain text X. That is, according to RSA encryption/decryption $$M = P1 * P2 \tag{1a}$$

$$C = X^E \bmod M \tag{1b}$$

$$X = C^D \bmod M \tag{1c}$$

Let K1 be the number of bits in P1 and K2 be the number of bits of P2. It should be noted that integers X, C and M each involve a number of bits that is about the sum of K1 plus K2.

To improve performance, the Chinese Remainder Theorem (CRT) is employed to take advantage of the fact that M is the product of two primes. For decryption, the CRT solution takes the form of evaluating the following expressions:

$$D1 = D \bmod (P1-1) \tag{2a}$$

$$D2 = D \bmod (P2-1) \tag{2b}$$

$$F1 = P2^{P1-1} \bmod M \tag{2c}$$

$$F2 = P1^{P2-1} \bmod M \tag{2d}$$

$$C1 = C \bmod P1 \tag{3a}$$

$$C2 = C \bmod P2 \tag{3b}$$

$$X1 = C1^{D1} \bmod P1 \tag{4a}$$

$$X2 = C2^{D2} \bmod P2 \tag{4b}$$

$$X = [(X1 * F1 \bmod M) + (X2 * F2 \bmod M)] \bmod M \tag{5}$$

It is noted that expressions 2a, 2b, 2c, 2d depend only on the values of P1 and P2 and therefore can be evaluated before the cipher text C is generated or received.

Steps 3a and 3b involve the modular reduction of a large integer C that has many more bits than either modulus P1 or P2. For example, when P1 and P2 each include 1024 bits, integer C would have 2047 or 2048 bits, about twice the number of bits in either P1 or P2. Blocks devoted to modular reduction usually depend on large precision division or multiple subtractions. Sometimes, rather than devote chip real estate to a simple MR block, blocks for other operations are reused for some cycles to obtain modular reduction residues of input integers. For example, a MM block is used determine the product of one and the input integer. However, none of these conventional approaches have provided MR blocks that accept very large input integers, such as input integers with more than 1024 bits.

Steps 4a and 4b involve modular exponentiation that may be performed using modular exponentiation (ME) blocks that employ Montgomery multiplication. In addition, step 5 involves two modular multiplies that may also be performed using ME blocks that employ Montgomery multiplication.

Montgomery multiplication for a modulus m involves a Montgomery Constant (MCm) that depends on the number of bits (K) in the modulus m. Specifically, two variables, K and R, are defined by the following two expressions $$2^{K-1} \leq m < 2^K, \quad (6a)$$

$$R = 2^K. \quad (6b)$$

A Montgomery multiplication sub-block (MMS) performs the following operation on two operands A1 and A2.

$$MMS(A1, A2) = A1*A2*R^{-1} \bmod m. \quad (6c)$$

The MMS can be used to determine the product B of two operands, A1, A2 as follows:

$$B' = MMS(A1, R^2), \quad (7a)$$

$$B = MMS(B', A2). \quad (7b)$$

The term $R^2$ used in equation 7a depends only on the modulus m and is the called the Montgomery Constant for modulus m (MCm). That is, $$MCm = R^2 \bmod m = (2^K)^2 \bmod m = 2^{2K} \bmod m. \quad (7c)$$

The conventional approaches to providing the Montgomery Constant compute the constant in software for multiple moduli involved in multiplication operations and to store the results on registers available to the Montgomery Multiplication sub-block (MMS). In some implementations, the register size devoted to stores the Montgomery Constants can grow large and consume valuable space on integrated circuits.

2.0 Structural Overview

FIG. 1 is a block diagram that illustrates an overview of a cryptographic processing system, according to an embodiment. The system includes an encryption/decryption integrated circuit, in which an embodiment is implemented. A client device 110 on a trusted local network 150 is connected to a non-secure, public network 155 through a gateway device 130. Client device 110 may be a network infrastructure element such as a router, switch, etc., that executes an SSL agent or IPSec process, for example. Alternatively, client device 110 may be a software process of an end station device such as a personal computer, workstation, server, etc. The gateway device 130 may be a computer or a network device such as a router. To encrypt and decrypt text, an encryptor/decryptor ASIC 131 is included in gateway device 130. Elsewhere connected to the network 155, a second client device 112 is connected through a second local network 152 and a second gateway 132 with a second encryptor/decryptor ASIC 133.

A first user of a process on client device 110 sends an electronic plain text message X to gateway 130 for encryption. A user, in this context, may be a programmatic process or software agent, as well as a human user. The message X may be a flow of data packets, an electronic document, or any other associated electronic data. Based on the address of the client device 130, or some other means of identifying the first user, a process on the gateway invokes the ASIC 131 for encrypting the message X with the shared parameters for the encryption algorithm along with the public key for the recipient at client device 112. Cipher text, (e.g., the integer C) is sent over the public network for client device 112.

The information for the client device 112 is received at gateway device 132, which invokes the ASIC 133 for decrypting the cipher text into plain text. The gateway device 132 passes the plain text to the ASIC 133. If the ASIC 133 is able to decrypt the cipher text (e.g., when the plain text X is generated, or when a digital signature is verified) then the message X is sent to a process on client device 112 over local network 152.

Figure 2:
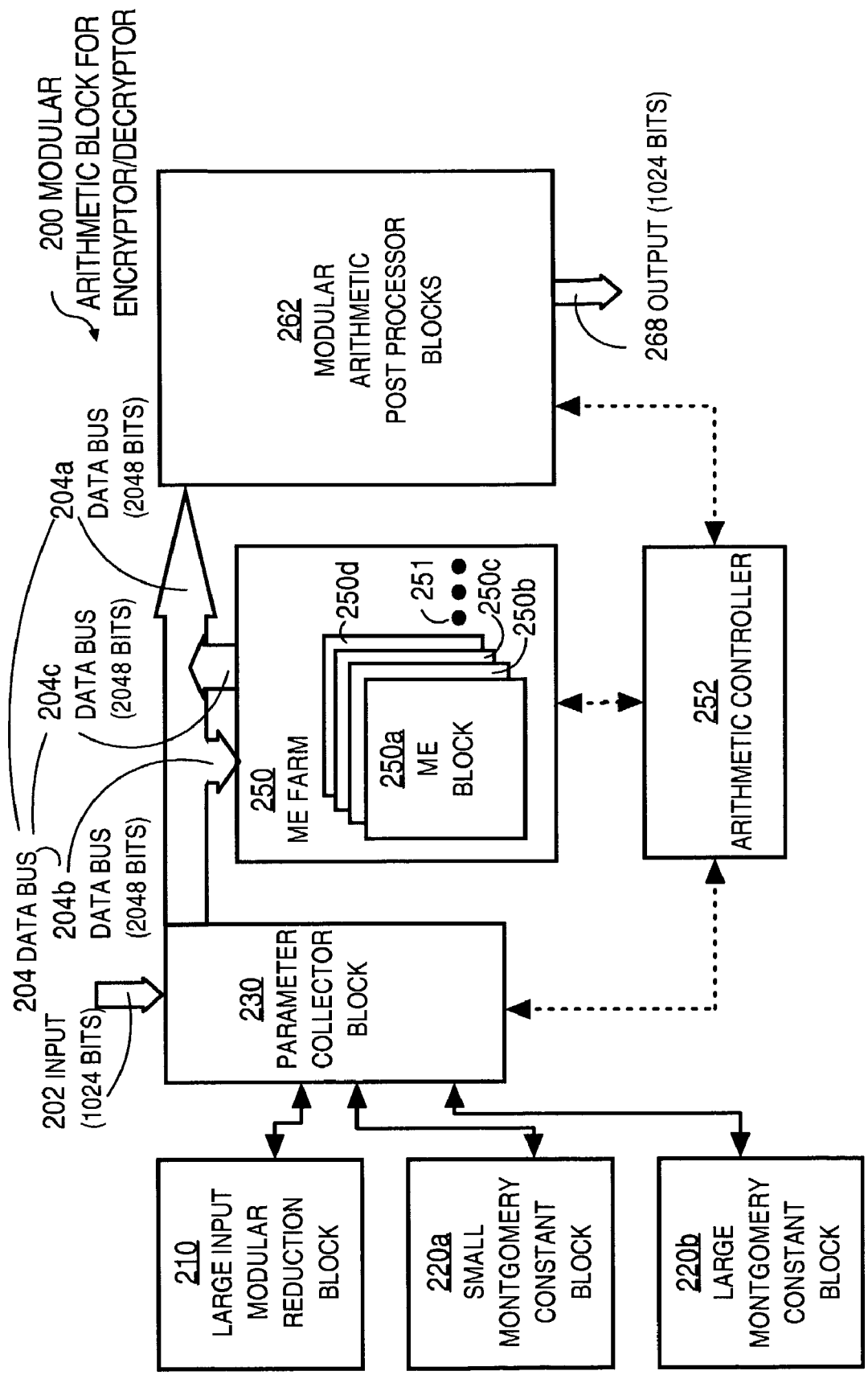
FIG. 2 is a block diagram that illustrates a modular arithmetic block for the cryptographic processing system of FIG. 1, according to an embodiment.

FIG. 2 is a block diagram that illustrates a modular arithmetic block 200 for the cryptographic processing ASIC, e.g., 131, 133 of FIG. 1, according to an embodiment. The modular arithmetic block 200 includes a modular exponentiation farm (ME farm) 250 of multiple ME blocks 250a, 250b, 250c, 250d among others, represented by ellipsis 251. In the illustrated embodiment, the ME farm 250 includes 16 ME blocks. Each ME block is able to perform modular exponentiation, modular multiplication, or modular reduction for up to three 1024-bit inputs (a modulus and one or two operands) based on control signals at one or more control inputs. The arithmetic block also includes an arithmetic controller 252 that determines which bits form which operands on which ME block and that provides the control signals for selecting exponentiation, multiplication or reduction. For example, under control of arithmetic controller 252, the ME farm 250 performs the operations indicated by Equations 4a, 4b, described above for RSA decryption.

The modular arithmetic block 200 also includes modular arithmetic post processing blocks 262 that includes one or more blocks to perform special modular operations, such as a 2048-bit modular exponentiation block and a 128-bit modular addition block, and includes a memory to store parameters for particular processes. The arithmetic controller 252 determines which bits form which operands on which blocks and provides control signals for the blocks in the modular arithmetic post processor blocks 262. For example, under control of arithmetic controller 252, the modular arithmetic post processor blocks 262 perform the operations indicated by Equation 5, described above for RSA decryption. The output from the modular arithmetic post processor blocks 262 are presented as output 268 from the modular arithmetic block 200. In the illustrated embodiment, the output 268 is presented in a 1024-bit buffer.

According to the illustrated embodiment, the modular arithmetic block 200 also includes a parameter collector block 230 that receives data indicating the parameters for the cryptographic process. The input to the modular arithmetic block 200 is provided as input 202 to the parameter collector block 230. In the illustrated embodiment, the input 202 is a 1024-bit buffer. For example, the parameter collector block 230 receives the moduli P1, P2, M, receives the precomputed parameters D1, D2, F1, F2 computed using equations 3a, 3b, 3c, 3d, and receives ciphertext C, described above for RSA decryption, all in a series of 1024-bit signals through input 202. In some embodiments, the parameter collector block 230 also receives parameters such as MU1 and MU2 which are determined by P1 and P2, respectively, and which are described in more detail below.

A data bus 204 carries data from the parameter collector block 230 to the ME farm 250 and the modular arithmetic post processor blocks 262. The data bus 204 includes channels 204a that go directly to the modular arithmetic post processor blocks 262 as well as channels 204b that go into the ME farm 250 and channels 204c that come out of the ME farm 250. In an illustrated embodiment, the data bus 204 includes 2048 channels to transfer 2048 bits in each processing cycle, including 128 bits to each of the 16 ME blocks 250a, 250b, 250c, 250d, 251 in ME farm 250. In some embodiments, the data bus 204 includes fewer channels and transfers data using additional processing cycles. In some other embodiments, the data bus 204 includes more channels and transfers data in fewer processing cycles. The bits received at parameter block 230 are directed to the ME farm 250 or the modular arithmetic post processor blocks 262 or to other blocks, described below, under the control of the arithmetic controller 252.

According to the illustrated embodiment, the modular arithmetic block 200 also includes a large input modular reduction block 210, a small Montgomery Constant block 220a and a large Montgomery Constant block 220b. In the illustrated embodiment, the parameter collector block 230 communicates two ways with each of these three blocks using a 128-bit data bus represented by the double-headed solid arrows in FIG. 2.

The large input modular reduction block 210 performs the computations of Equations 3a, 3b, described above for RSA decryption. More details on the large input modular reduction block 210 are described below with reference to FIG. 5A, FIG. 5B and FIG. 6. KM represents the number of bits to hold modulus M; K1 represents the number of bits to hold modulus P1, and K2 represents the number of bits to hold modulus P2. According to the illustrated embodiment, the large input reduction block 210 determines the residue of the text C for both modulus P1 and P2, combined, in a number of processing cycles N210 that is about 75% of the sum of the number of bits K1 and K2 in the two moduli P1 and P2. That is, $$N210 \approx 0.75*(K1+K2) \approx 0.75*KM \quad (8a)$$

The small Montgomery constant block 220a performs the computations of Equation 7c for modulus m=P1 or m=P2, described above for RSA decryption. The large Montgomery constant block 220b performs the computations of Equation 7c for modulus m=M=P1*P2, described above for RSA decryption. More details on the Montgomery Constant blocks 220a, 220b are described below with reference to FIG. 4. Km represents the number of bits to hold modulus m. According to the illustrated embodiment, the Montgomery constant blocks 220a, 220b determine the Montgomery Constant for modulus m in a number of cycles N220 that is about the number of bits in the modulus m. That is, $$N220 \ Km \quad (8b)$$

$$N220 \approx Km \quad (8b)$$

Because the Montgomery Constant for modulus M is computed in hardware instead of software, the computation is faster, with less latency, than computing the Montgomery Constant for modulus M in software.

As shown in FIG. 2, the blocks 210, 220a, 220b are connected in parallel to the parameter collection block 230. By connecting these blocks in parallel, the Montgomery Constant for both small moduli, P1 and P2, can be computed by block 220a, and the modular reduction of C for both small moduli can be computed by block 210, while the Montgomery Constant for the large modulus M is computed by block 220b. Thus the computation of the modular reductions of C and the Montgomery Constants, for both small moduli, can be computed with no increase in latency while the Montgomery Constant for the large modulus M is computed.

3.0 Functional Overview

Figure 3:
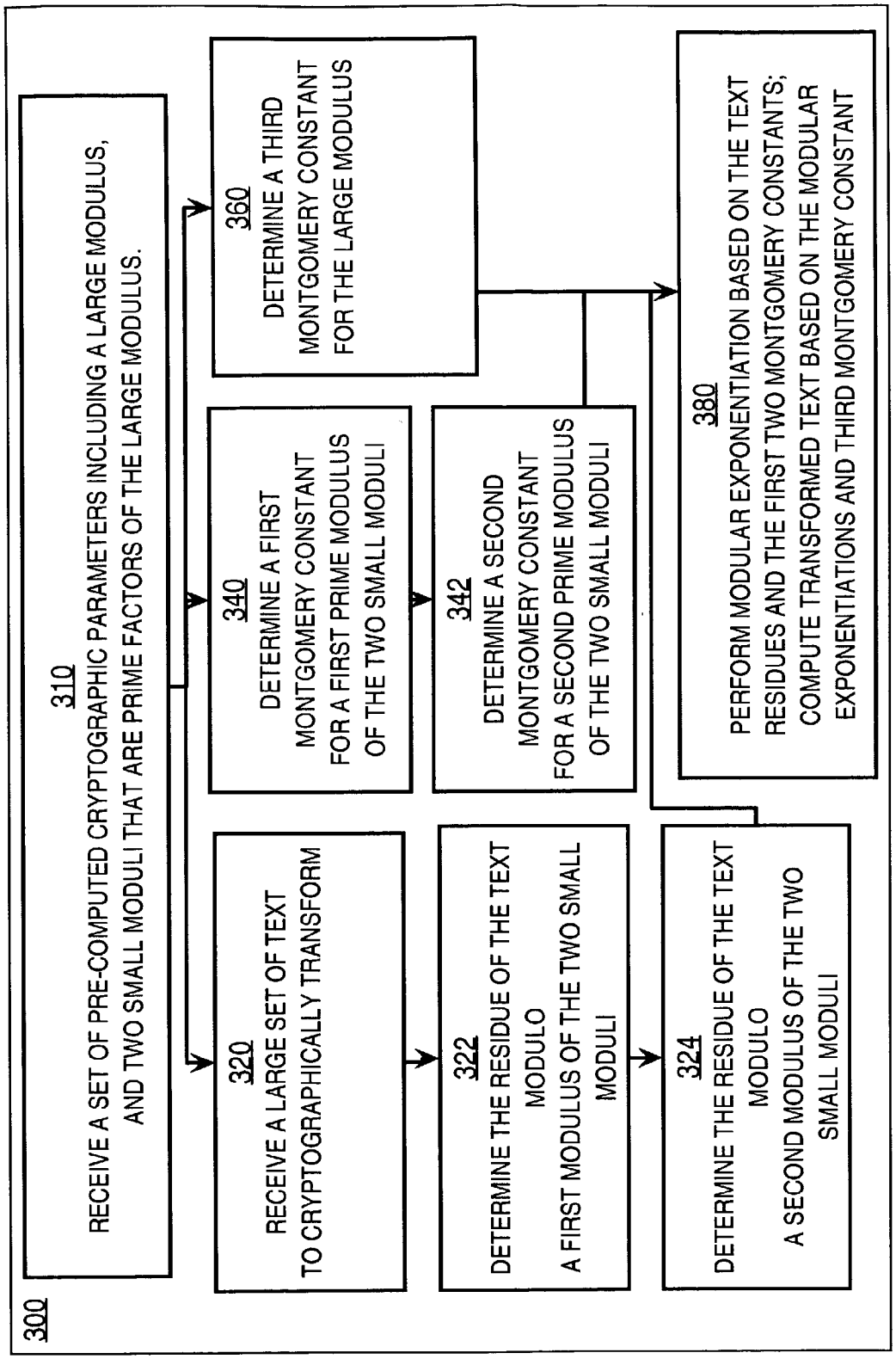
FIG. 3 is a flowchart that illustrates a high level overview of one embodiment of a method for using the modular arithmetic block of FIG. 2.

FIG. 3 is a flowchart that illustrates a high level overview of embodiment 300 of a method for using the modular arithmetic block 200 of FIG. 2. Although steps are depicted in a particular order in FIG. 3 and subsequent flowcharts, in other embodiments the steps can be performed in a different order or overlapping in time. For example step 320 may be performed before step 310 or overlapping in time with step 310.

In step 310, parameters are received for a cryptographic process. For example, the parameters P1, P2, M, D1, D2, F1, F2 for RSA decryption are received through input 202 at block 230. For purposes of illustration, it is assumed that M, F1, F2 each involve 2048 bits and that the other parameters each involve 1024 bits or fewer.

In step 320, a large set of text T is received to transform using cryptographic processing. For example the cipher text C is received at the parameter collector block 230 to be transformed to plain text X during RSA decryption. In other embodiments, other text is received, such as plain text X to be transformed to cipher text C during RSA encryption, or cipher text representing a digital signature is received. For purposes of illustration, it is assumed that the large set of text includes 2048 bits.

In step 322, the modular reduction of the text modulo a first modulus of the small moduli is performed to produce the first text residue. For example, the collector block 230 sends the text C and the moduli P1, P2 to the large input modular reduction block 210. The large input modular reduction block 210 computes a residue C1 by performing the modular reduction of the cipher text C modulo the modulus P1 in 0.75*K1 processing cycles. In the illustrated example, the parameter collection block 230 receives the value of the residue C1.

In step 324, the modular reduction of the text modulo a second modulus of the small moduli is performed to produce the second text residue. For example, the block 210 computes a residue C2 by performing modular reduction of the cipher text C modulo the modulus P2 in 0.75*K2 processing cycles. In the illustrated example, the parameter collection block 230 receives the value of the residue C2. If other moduli are involved, such as in algorithms using more than two prime factors, the modular reduction of the text modulo the additional moduli are also evaluated. According to the RSA decryption process, there are no other prime factors of M.

In step 340, the Montgomery Constant for the first modulus of the small moduli is computed. For example, the collector block 230 sends the modulus P1 to the small Montgomery constant block 220a. The small Montgomery Constant block 220a computes the Montgomery Constant MCP1 for modulus P1 in K1 processing cycles. In the illustrated example, the parameter collection block 230 receives the value of MCP1.

In step 342, the Montgomery Constant for the second modulus of the small moduli is computed. For example, after K1 processing cycles, the collector block 230 sends the modulus P2 to the small Montgomery constant block 220a. The small Montgomery Constant block 220a computes the Montgomery Constant MCP2 for modulus P2 in K2 additional processing cycles. In the illustrated example, the parameter collection block 230 receives the value of MCP2. If other moduli are involved, such as in algorithms using more than two prime factors, the Montgomery Constants of the additional moduli are also evaluated. According to the RSA decryption process, there are no other prime factors of M.

In step 360, the Montgomery Constant for the large modulus is computed. For example, the collector block 230 sends the modulus M to the large Montgomery constant block 220b. The large Montgomery Constant block 220b computes the Montgomery Constant MCM for modulus M in KM processing cycles. In the illustrated example, the parameter collection block 230 receives the value of MCM.

Steps 320, 340, 360 are illustrated as starting at the same time. In other embodiments, one or more may start later than others. For example, because it is estimated that step 360 takes more processing cycles to complete than steps 320, 322, 324, step 360 is started first in some embodiments. To take advantage of the parallel connections between the collector 230 and each of the blocks 210, 220a, 220b, some embodiments start each of steps 320, 340, 360 before any of steps 324, 342, 360 complete.

In step 380, the text residues and Montgomery Constants are used to continue processing according to the cryptographic algorithms being employed. For example, for RSA decryption, the text residues C1, C2, are used according to Equations 4a, 4b to evaluate X1 and X2 by employing two ME blocks of the ME farm 250 and the Montgomery Constants MCP1, MCP2. Then the results X1, X2 and parameters F1, F2 are used according to Equation 5 to produce plain text X by employing a large, 2048-bit exponentiation using the large Montgomery Constant MCM and a large, 2048-bit exponentiation block in the post processing blocks 262.

Using the steps of method 300, the computation of the residues C1, C2 of C, and the Montgomery Constants MCP1, MCP2 for both small moduli can be computed with little or no increase in latency while the Montgomery Constant MCM for the large modulus M is computed.

4.0 Montgomery Constant Computation

Figure 4:
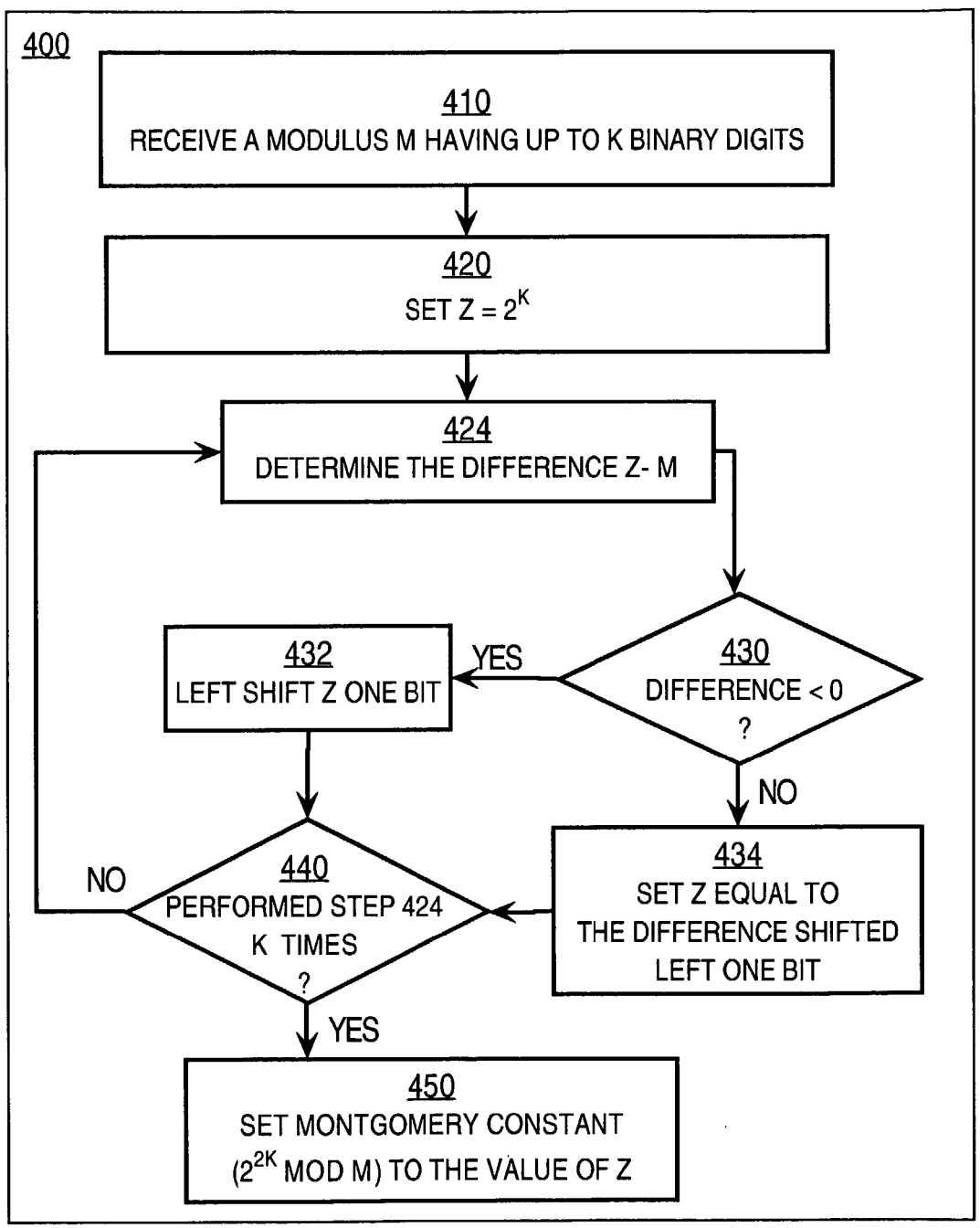
FIG. 4 is a flowchart that illustrates one embodiment of a method to compute a Montgomery Constant for cryptographic processing.

FIG. 4 is a flowchart that illustrates one embodiment 400 of a method to compute a Montgomery Constant for cryptographic processing. In various embodiments, the method may be implemented in hardware or in software or both. In the illustrated embodiment, the method is implemented in each of two hardware blocks: a first block for relatively small moduli, e.g., 1024 bits and less; and a second block for relative large moduli, e.g. 1025 to 2048 bits. In other embodiments the boundary between large and small moduli may be different. In some embodiment more than two blocks associated with more than two ranges of moduli sizes may be employed. The method yields a Montgomery Constant for a modulus m having K bits in a number of cycles N=K.

In step 410, a modulus m having up to K bits is received. This can be accomplished in one or more processing cycles depending on the number of channels in the data bus and the size of the modulus m. For example, with a 128-channel data bus capable of transferring 128 bits in one cycle, a modulus of 1024 bits can be received in 8 cycles. The size K can be deduced from the modulus m using any method known in the art. One approach is described below with reference to Equation 9a.

In step 420 a variable Z is set to a value of two raised to the power of K. In hardware this is done by storing a value of 1 in the (K+1) bit of a register, as counted from the least significant bit. The register is herein called the "Z register" and is big enough to handle the largest modulus for the block. For example, in a small Montgomery constant block designed for a modulus m up to 1024 bits in size, the Z register includes 1025 bits. In a large Montgomery Constant block designed for a modulus up to 2048 bits in size, the Z register includes 2049 bits. In one embodiment, the K+1 bit is efficiently set to 1 with limited chip area and limited latency by inputting the value of 1 to a bank of shifters. The bank of shifters includes a combination of 256-bit shifters, 64-bit shifters, 16-bit shifters, 4-bit shifters and 1-bit shifters.

Steps 424, 430, 432 or 434, and 440 form a loop that is traversed K times. Any manner of forming the loop in hardware or software may be used.

In step 424, the difference is determined between Z and the modulus m by subtracting m from Z. In step 430, it is determined whether the difference is negative. If the difference is negative, control passes to step 432; if not control passes to step 434. The first difference will not be negative, so control will first pass to step 434.

In step 434 the difference is shifted left one bit, effectively doubling the difference, and the shifted difference is stored in the a memory locations such as variable Z in memory or in a special Z register. Control passes to step 440 to determine whether to traverse the loop again.

If the difference is negative, then the contents of the Z variable (or Z register) is shifted left one bit, effectively doubling the value of Z, and the shifted result is stored in the variable Z (or Z register). Control passes to step 440 to determine whether to traverse the loop again.

Step 440 represents a decision point for traversing the loop again. For example, if the difference has not been computed K times, then control passes back to step 424 to traverse the loop again. If the difference has been computed K times, the loop ends and control passes to step 450. Therefore the loop consumes K processing cycles, where K is the number of bits in modulus m.

In step 450, the Montgomery Constant MCm for modulus m is set to the value of Z. As defined in Equation 7c, the Montgomery Constant for modulus m is $2^{2K}$ mod m. For example, the value of Z register is placed in a buffer that can be read by the parameter collector block 230, or an "is valid" flag is set to indicate that the value in the Z register is the final value after the loop.

Using the method 400 of FIG. 4, the Montgomery Constant can be determined in hardware or software. If performed on dedicated circuit blocks or on dedicated general purpose processors, all the Montgomery Constants associated with a cryptographic process can be determined in parallel, without increasing latency over the number of cycles inherent in the computation of the Montgomery Constant for the larges modulus.

5.0 Modular Reduction Computation

Figure 5A:
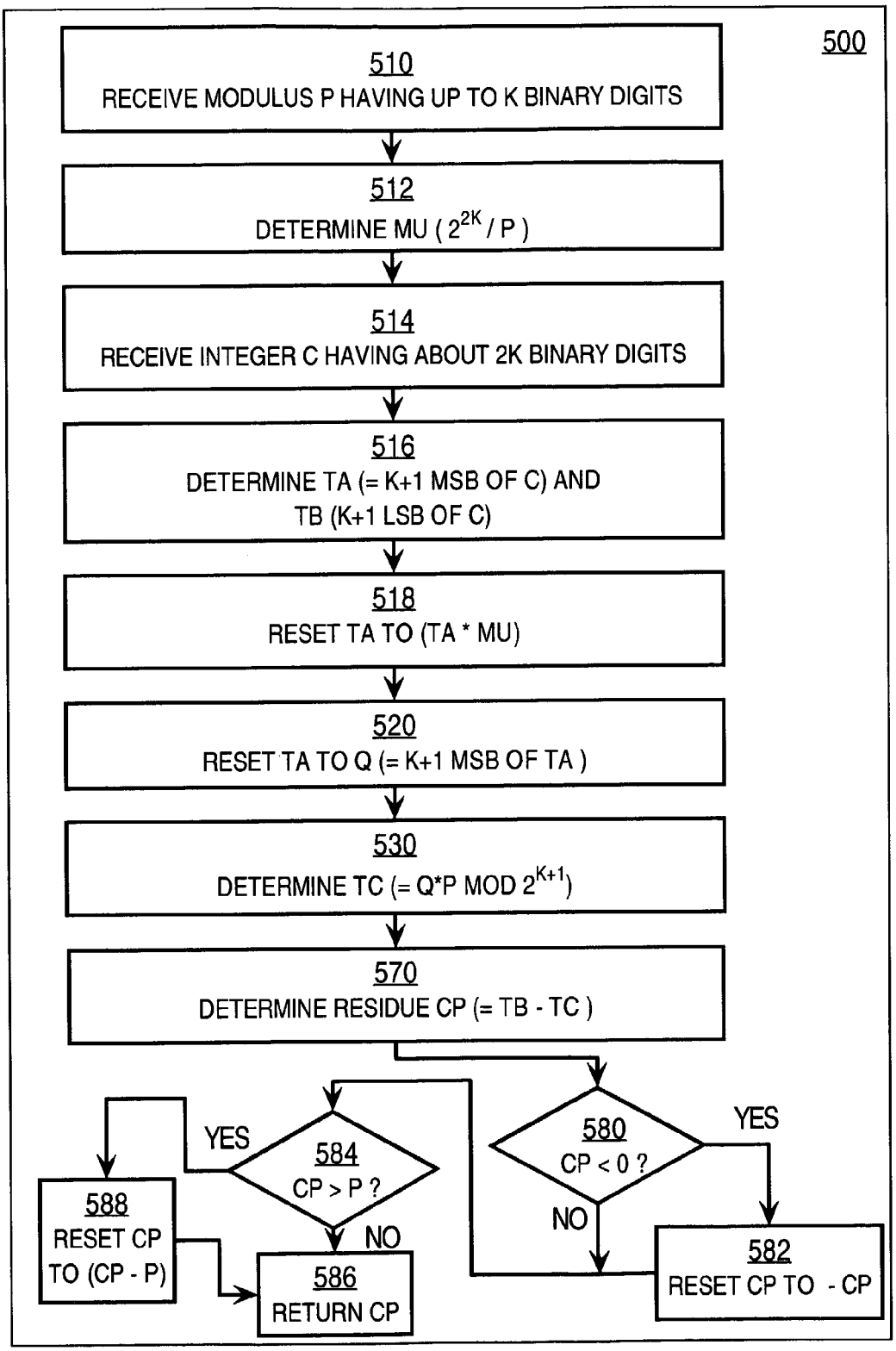
FIG. 5A is a flowchart that illustrates one embodiment of a method to perform modular reduction without precision division or excessive subtractions.

FIG. 5A is a flowchart that illustrates one embodiment of a method to perform modular reduction without precision division or excessive subtractions. Such a method is desirable over precision division or multiple subtractions in many cases. In general, if the difference in bit sizes between the cipher text and modulus is greater than 16 bits, repeated subtraction is not used. For example, for a ciphertext having 1030 bits and a modulus having 1024 bits, then repeated subtraction may be used; in contrast, for a ciphertext of 32 bits and a modulus of 12 bits, repeated subtraction is not used. If the ciphertext size is greater than 64 bits, then precision division is not used. Thus, for a ciphertext of 1030 bits and a modulus of 1024 bits, precision division is not used. For a ciphertext of 32 bits and a modulus of 12 bits, then precision division can be used.

FIG. 5A is based on Barrett's algorithm, described in the reference "Implementing the Rivest Shamir and Adleman Public Key Encryption Algorithm on a Standard Digital Signal Processor," P. Barrett, in *Advances in Cryptology—CRYPTO '86 Proceedings*, Springer-Verlag, 1987, pp. 311–323 (hereinafter Barrett). The reference does not suggest optimizing the algorithm for implementation in hardware rather than on a general-purpose processor.

According to Barrett, text T has less than 2*K bits where K is the number of bits in the modulus P. Given P, K can be computed according to Equation 9a.

$$K=[\log_2 P]+1 \quad (9a)$$

where $\log_2$ represents the logarithm operation to the base 2 on the following operand. A factor MU depends on the reciprocal of P according to Equation 9b.

$$MU=[2^{2K}] \text{ div } P \quad (9b)$$

where div represents an integer result from a division by the following operand. MU is independent of the text T being operated on; so MU can be predetermined and stored when P is defined, and used for several sets of text T using the same public and private keys without further divisions. A first quantity, Q, is defined by Equation 9c.

$$Q=([T \text{ div } 2^{K-1}]*MU) \text{ div } 2^{K+1} \quad (9c)$$

A second quantity, S, is defined by Equations 9d and steps listed as 9e and 9f $$S=(C \bmod 2^{K+1})-([Q*P] \bmod 2^{K+1}) \quad (9d)$$

If (S<0) then reset S to $S+2^{K+1}$ (9e)

while (S>P) reset S to S−P (9f)

Resetting S in step 9e amounts to changing the sign bit of a signed integer. When S is no longer reset, S contains the residue of the text T modulo the modulus P.

Embodiments utilize the method in FIG. 5A implemented in software on a general-purpose processor or in hardware. The implementation is used as the large input modular reduction block 210.

In step 510, a modulus P having up to K binary digits is received. For example, modulus P1 is received by the large input modular reduction block 210. Modulus P has up to K bits. If K is not provided as input, K is determined based on P and Equation 9a.

In step 512, a value for MU is determined as defined in Equation 9b. In some hardware implementations, MU is pre-computed in software or in a different hardware block and passed to the modular reduction block 210 and stored there for all computations involving the same keys. For example, in RSA decryption embodiments, values of MU for both P1 and P2 are received and stored in memory on the modular reduction block 210.

In step 514, a value for the text T, having fewer than 2*K bits, is received. For example, 2048 bits of the cipher text C is received.

In step 516, a first temporary variable called the TA variable (or a temporary register called the TA register) is set to the K+1 most significant bits (MSB) of T. This is equivalent to a divide by $2^{K-1}$, a power of two. A second temporary variable called the TB variable (or a temporary register called the TB register) is set to the K+1 least significant bits (LSB) of T. This is equivalent to modular reduction by $2^{K+1}$, a power of two. In hardware implementations, MSB and LSB selections, and integer division by a power of two, and modular reduction by a power of two, are readily accomplished with small chip area and few processing cycles using shifters such as the shifters bank described above with reference to step 420 of FIG. 4. The TB variable (or TB register) includes the value for the first term in Equation 9d.

In step 518, the contents of the TA variable (or the TA register) are reset to the product of the former contents and MU. In step 520, the contents of the TA variable (or the TA register), are reset to the K+1 MSB of Q. This is equivalent to a divide by $2^{K+1}$. Steps 516, 518, 520 yield the quantity Q according to Equation 9c.

In step 530, a third temporary variable called the TC variable (or a temporary register called the TC register) is set to the K+1 LSB of the product of Q and P, as in the second term of Equation 9d. In one embodiment, a large multiplier is used to perform the multiply, but only the K+1 LSB are stored in the TC register. This embodiment allows all the steps of method 500 to be completed in a number of processing cycles that is about 0.75*K. More details on how to perform step 530 in an alternative hardware embodiment are described below with reference to FIG. 5B.

In step 570, the residue variable (or the register called the residue register), represented by the symbol CP, is set to the difference of subtracting from the first term of Equation 9d the second terms of Equation 9d, stored in the TB and TC variables (or TB and TC registers), respectively. This step completes the evaluation of Equation 9d.

In step 580 a test is performed to determine whether the contents of the residue variable (or the residue register) represent a negative number. If the contents are not negative, control passes to step 584. If the contents are negative, control passes to step 582 to reset the contents of the residue variable (or the residue register) to a positive number by negating the contents. Control passes to step 584.

In step 584, it is determined whether the contents of the residue variable (or the residue register) represent a number greater than the modulus P. If so, control passes to step 588 to reset the contents of the residue variable (or the residue register) to the difference obtained by subtracting the modulus P from the contents of the residue variable (or residue register). Because of the value selected for MU in step 512, step 588 is expected to be performed no more than two times.

A residue computed only with subtractions, would be expected to involve about $2^{KM-KP}$ subtractions, where KM is the number of bits in the large modulus M and KP is the number of bits in smaller modulus P. Therefore an excessive number of subtractions, and the excessive latency caused by the excessive subtractions, are avoided using MU in step 512.

In step 586, the value of the residue variable (or the residue register) is output, in any manner known in the art. For example, the contents are moved to an output buffer. In some embodiments, CP is already in an output buffer, and a valid bit is set in the output buffer during step 586 to indicate that the contents of the output buffer are valid for reading.

Steps 510 to 570 are repeated for P=P2 having up to K2 bits. In hardware implementations, this is accomplished by using the same hardware components in later processing cycles with different inputs.

Using the steps of method 500, Barrett's algorithm can be efficiently implemented in hardware at a relatively low cost in terms of chip area (e.g., few temporary registers) and latency.

Figure 5B:
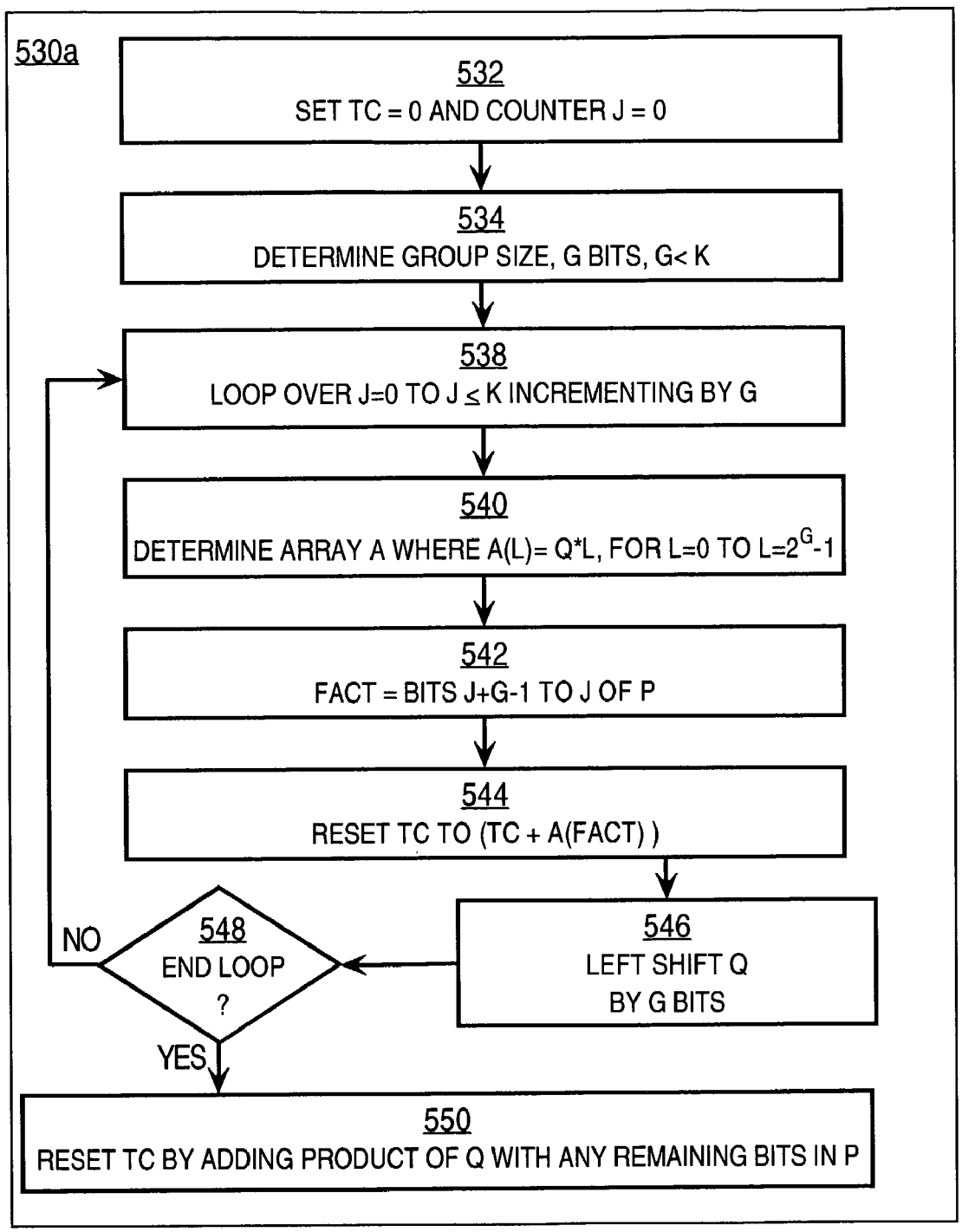
FIG. 5B is a flowchart that illustrates one embodiment of a method to perform a step of the method of FIG. 5A.

FIG. 5B is a flowchart that illustrates an alternative embodiment 530a of a method to perform step 530 of the method 500 of FIG. 5A. In step 530a, the TC register is set to the K+1 LSB of the product of Q and P. The value of Q is stored in the TA register. Since Q is not used after step 530, the value in the TA register can be modified during the operation.

In step 532, the TC register and a counter J are initialized with all zeros. The counter J is used to track which bits of P have been multiplied by Q.

In step 534 a group size G is determined, which indicates how many bits of P are multiplied by Q during each processing cycle. There is a trade off between the size of sub-block devoted to computing the modular product and the number of processing cycles consumed to yield the product. To save size, G is chosen to be much smaller than K. In some embodiments, G=1. In hardware implementations, step 534 is performed once, at design time when the sub-block to perform the multiplication is designed and fabricated.

Steps 538, 540, 542, 544, 546, 548 form a loop that is traversed enough times to multiply every bit in P by Q. Only the bits of Q and P that contribute to the K+1 LSB of the product are kept. When G=1, the loop is traversed K times and consumes K cycles. When G>1, the loop is traversed fewer than K times and consumes fewer cycles. Any manner of forming the loop in hardware or software may be used.

In step 538, the value for the counter J during the current traversal of the loop is determined. J starts at zero and is incremented by G during each traversal. The loop is not traversed if J is greater than K. When K+1 divided by G is not an integer, the last bits of P are multiplied by Q using special logic, easily determined by one of ordinary skill.

In step 540, the values of Q*L are determined for $2^G-1$ values of L. When G=1, the two values of the product are 0 and Q. When G>1, the values of the product are 0, Q, . . . $2^G-1*Q$. The values are stored in an array of registers or on chip memory. The values are readily determined in one processing cycle by banks of shifters and adders. For example, if G=3, then the array has elements from 0 through $2^3-1$, which is 7; i.e. the array has 8 elements from 0 to 7. At each position in the array is a value of a multiple of Q from 0 to 7*Q. In hardware, completely filling this small array can be performed consuming less chip area and processing cycles then are consumed by inserting a high precision multiplication block to form the one product needed.

In step 542, the bits of P to be multiplied by Q are determined and stored in the variable called "FACT" herein. For example, from most significant to least significant bits, FACT is set to the bits in positions J+G−1 to J of the modulus P. When G=1, FACT is set to the bit in the J position of the modulus P. It is assumed for purposes of illustration that G=3, J=6 and the 3 bits in the 8th, 7th and 6th positions of P are "011" which is "3" in decimal notation.

In step 544, the TC register is reset to the contents in the TC register added to the value in the array associated with the position given by the bits in the FACT variable. For example, the bits "011" in the FACT variable indicate the 3rd position, and the value in the 3rd position of the array is 2*Q. This value 2*Q is then added to the value already in the TC register.

In step 546, Q is left shifted by G bits, which is equivalent to multiplying Q by $2^G$ This step assures that the products computed in the next traversal of the loop are added to the correct bit positions in TC. To achieve a correct result with such shifting, the memory location that holds Q, such as the TA register, should have at least K+1 bits.

Step 548 represents a decision point for traversing the loop again. If the loop is traversed again, because after incrementing J by G, J is still no greater than K, then control returns to step 538. If, after incrementing, J is greater than K, control passes to step 550.

In step 550, the remaining bits of P, if any, are multiplied by Q and the product is added to the TC register.

Using the steps of method 530a, the product P*Q mod $2^{K+1}$ can be efficiently implemented in hardware at a cost in terms of chip area and latency that depends on the choice of G.

6.0 Modular Reduction Block

Figure 6:
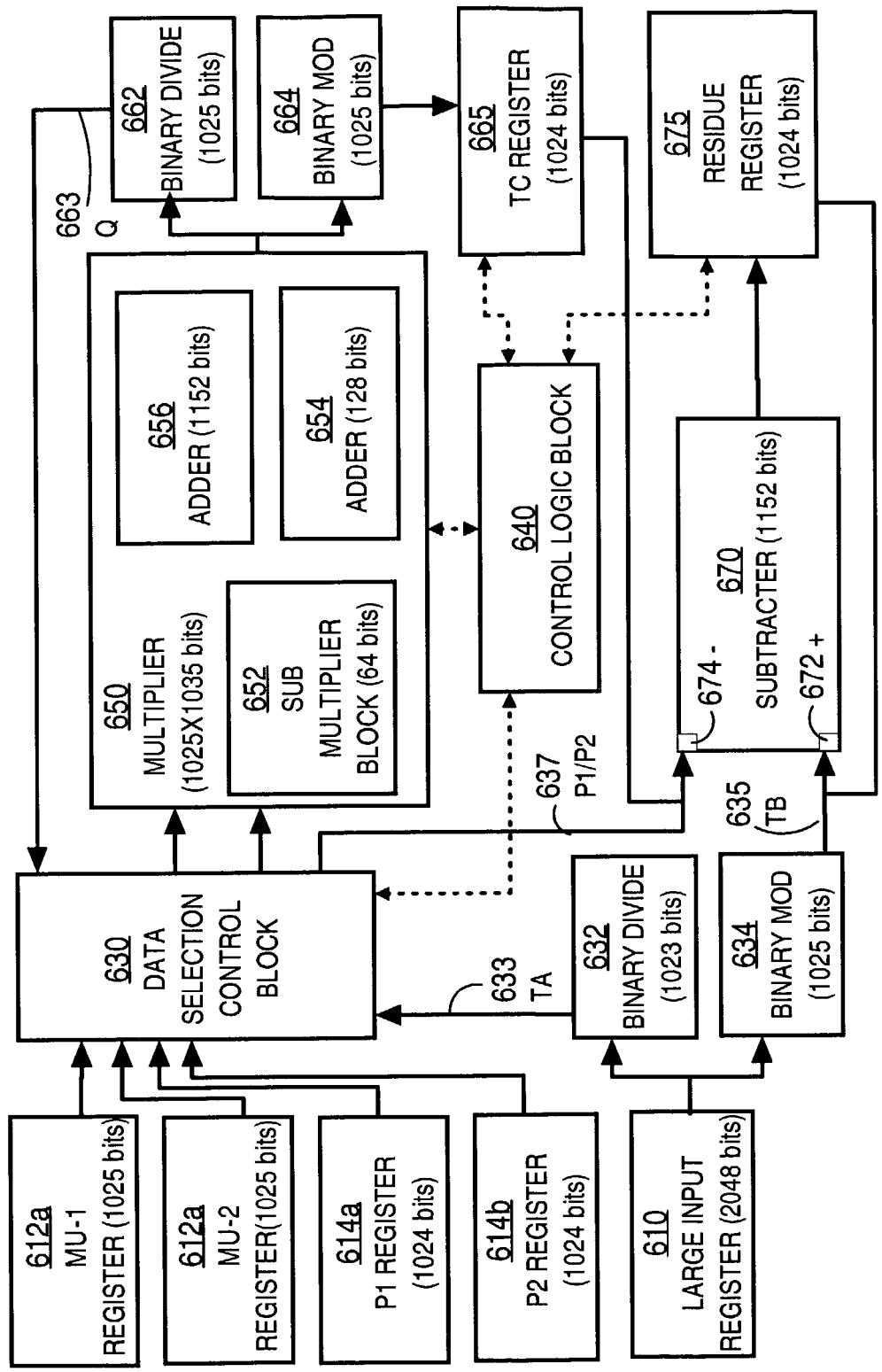
FIG. 6 is a block diagram of a MR block to perform modular reduction without precision division or excessive subtractions, according to an embodiment.

FIG. 6 is a block diagram of a MR block 210a to perform modular reduction without precision division or excessive subtractions, according to an embodiment. The MR block 210a implements the steps of method 500 for RSA decryption.

The MR block 210a includes two smaller registers 614a, 614b ("P registers") for storing data representing the two smaller prime moduli of RSA decryption, P1 and P2, respectively. In the illustrated embodiment the registers 614a, 614b hold 1024 bits to accommodate moduli up to that size. In other embodiment, other boundaries between small and large moduli may be selected. For example, widely used modulus sizes may be included in a small register, while larger but more rarely used modulus sizes may be included in a large register. In some embodiments, the moduli sizes may be divided into more than two ranges.

The MR block 210a also includes two registers 612a, 612b ("MU registers") for storing data representing MU1 and MU2, as computed using Equations 9a and 9b for the two smaller prime moduli, P1 and P2, respectively. In the illustrated embodiment, the registers 612a, 612b hold 1025 bits to accommodate MU up to that size. In some embodiments, the values of MU1 and MU2 may be computed in hardware sub-blocks (not shown) based on the values of P1 and P2.

The MR block 210a also includes one register 610 (a "T register") for storing data representing the large input text T, such as cipher text C or plain text X. In the illustrated embodiment, the register 610 holds 2048 bits to accommodate values of C or X up to that size. The register 610 is connected to a binary divide sub-block 632 and a binary mod sub-block 634. The binary divide sub-block 632 outputs the MSB of the value in the T register 610, up to 1023 bits. In the illustrated embodiment, this output is the initial value of TA computed during step 516, as indicated by the arrow 633 in FIG. 6. The value may be stored in a TA register (not shown) within the data selection control block 630. The binary mod sub-block 634 outputs the LSB of the value in the T register 610, up to 1025 bits. In the illustrated embodiment, this output is the value of TB computed during step 516, as indicated by the arrow 635 in FIG. 6.

Using a 128-bit data bus, it takes 50 processing cycles to load the registers 610, 612a, 612b, 614a, and 614b.

The MR block 210*a* includes a control logic block 640 and a data selection control block 630. The control logic block 640 determines which values are produced during which processing cycle and provides control signals for one or more of the other sub-blocks. The control logic block 640 includes one or more state machines and counters that track the state of the various sub-blocks and the processing cycles.

The data selection block 630 directs data from one or more of the registers to one or more of the other sub-blocks. For example, in some embodiments, the data selection block includes several multiplexers and a multiplexer control component. The two P registers 614*a*, 614*b* and the two MU registers 612*a*, 612*b* are connected as inputs to the data selection control block 630. In addition, the MSB of text T output by the binary divide sub-block 632, shown as the output 633, is connected as an input to the data selection control block 630.

The MR block 210*a* includes a multiplier block 650 and a subtracter block 670. In the illustrated embodiment the subtracter block 670 works with operands having up to 1152 bits. The subtracter block 670 includes two operand inputs 672, 674. Operand input 672 accepts values for a first operand and operand input 672 accepts values for the operand that is subtracted from the first operand. The subtracter block 670 is used to perform the subtractions during steps 570 and 582 described above with reference to FIG. 5A.

In the illustrated embodiment the multiplier block 650 works with operands having up to 1025 bits. The multiplier block 650 is used to perform the multiplications during step 518 and 530 described above with reference to FIG. 5A. In the illustrated embodiment, the multiplier block 650 is based on a bit-serial architecture and includes a multiplier sub-block 652, a large adder 654 and a small adder 652. The architecture was chosen to reduce the overall gate count of the MR block 210*a*. The multiplier sub-block 652 computes the product of two operands up to 64 bits in size. The small adder 654 computes the sum of two operands up to 128 bits in size. The large adder 656 computes the sum of two operands up to 1152 bits in size.

Outputs from the data selection control block 630 are directed to the two operands of a multiplier 650 or to the input 674 of the subtracter 670. For example, during step 518 for the first modulus P1, described above with reference to FIG. 5A, the output 633 that contains data representing the initial value of TA is directed to one operand of multiplier 650 and the data from MU register 612*a* is directed to the other operand. During step 530 for the first modulus P1, the output 663 that contains data representing Q (as described below) is directed to one operand of multiplier 650 and the data from P register 614*a* is directed to the other operand. In some embodiments, both TA and Q are stored in a TA register in the data selection control block 630. During step 582 for the first modulus P1, the data from P register 614*a* is directed to the input 674 for the subtracted operand on the subtracter 670.

The output from the multiplier 650 goes to either a binary divide sub-block 662 or a binary mod sub-block 664, based on a control input signal provided by the control logic block 640. For example, during step 520, when the MSB of the product of MU and the contents of TA are obtained, the product is directed through binary divide sub-block 662. In the illustrated embodiment, this output from binary divide sub-block 662 is the value of Q, the final contents of TA, as indicated by the arrow 663 in FIG. 6. In some embodiments, this output is stored in the TA register of the data selection control block 630. During step 530, when the LSB of the product of P and Q are obtained, the product is directed through binary mod sub-block 664. In the illustrated embodiment, this output from binary mod sub-block 662 is the contents of TC, as indicated by the TC register 665 in FIG. 6

During step 570, the data from the TC register 665 is directed to the subtracted input 674 of subtracter 670; and the TB output 635 from binary mod sub-block 634 is directed to the other operand, as depicted in FIG. 6. The result is the first estimate of the residue and is placed in the residue register 675. For example, the result is the first estimate of the residue CP of the cipher text C, such as C1 for the first modulus P1.

During step 580, the control logic block 640 determines whether the value in the residue register 675 is negative. If so, then the value is the residue register 675 is negated by the control logic block 640.

During step 584, the control logic block 640 determines whether the value in the residue register 675 is greater than the value in the P register 614*a* or 614*b* for the current modulus, P1 or P2, respectively. If so, then another subtraction is performed during step 588. This subsequent subtraction is performed by the MR block 210*a*. The contents of the residue register 675 are input to the first input 672 of the subtracter 670. The contents of one of the moduli, indicated by P1/P2 output 637 from the data selection control block 630, are input to the subtracted input 674 of the subtracter 670.

Therefore, the modular reduction block 210*a* is one implementation in hardware for the method 500 depicted in FIG. 5A.

7.0 Hardware Overview

Figure 7:
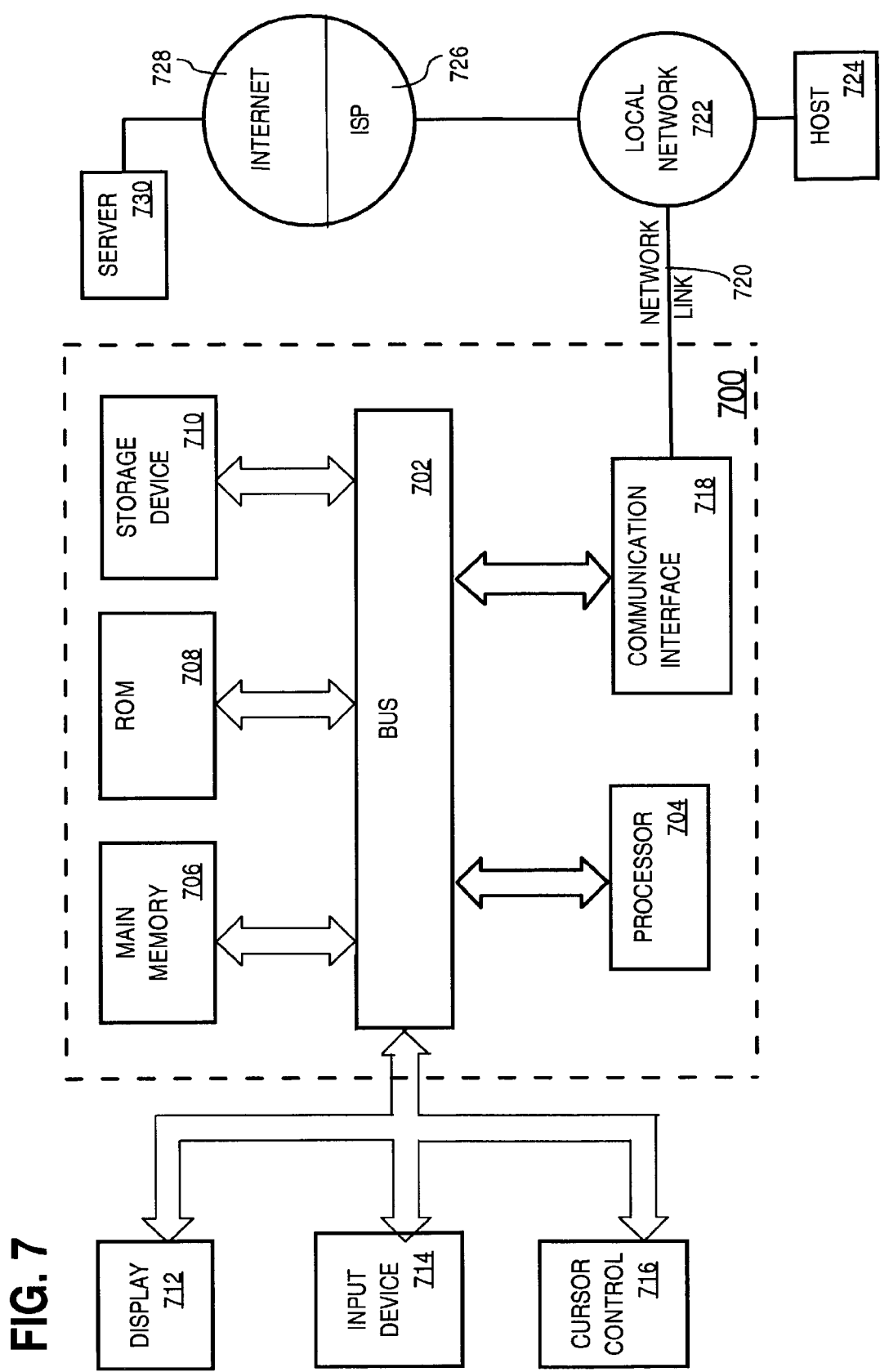
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to storage media such as, non-volatile storage media or volatile storage media, and transmission media. Non-volatile storage media includes, for example, optical or magnetic disks, such as storage device 710. Volatile storage media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, punch cards, paper tape, any other physical medium with patterns of holes, a RAM, a PROM, and EPROM, a FLASH-EPROM, any other memory chip or memory cartridge, or any other storage medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

8.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for cryptographic data processing, comprising:
   a first circuit configured to determine, based on a modulus and an integer, a first residue of the integer modulo the modulus, wherein:
     the modulus has a number of binary digits; and
     the integer represents either plaintext or ciphertext
   a second circuit configured to determine, based on the modulus and the number of binary digits, a second residue of two raised to the power of twice the number of binary digits modulo the modulus;
   wherein at least a first portion of time during which the first circuit determines the first residue is the same as a second portion of time during which the second circuit determines the second residue; and
   a third circuit configured to determine, based on the first residue and the second residue, a cryptographic result.

2. An apparatus as recited in claim 1, wherein:
the number of binary digits is a first number of binary digits;
the modulus is a first modulus;
a second modulus has a second number of binary digits; and
the apparatus further comprises:
   a fourth circuit configured to determine, based on the second modulus and the second number of binary digits, a third residue of two raised to the power of twice the second number of binary digits modulo the second modulus;
   wherein at least a third portion of time during which the first circuit determines the first residue is the same as a fourth portion of time during which the fourth circuit determines the third residue; and
   wherein at least a fifth portion of time during which the second circuit determines the second residue is the same as a sixth portion of time during which the fourth circuit determines the third residue.

3. An apparatus as recited in claim 1, wherein:
the cryptographic result is either the plaintext or the ciphertext; and
the third circuit is further configured to determine the cryptographic result based on a public-key private-key pair.

4. An apparatus as recited in claim 1, wherein the third circuit is further configured to determine the cryptographic result based on an encryption algorithm selected from the group consisting of the Rivest, Shamir, and Adleman (RSA) algorithm, Barrett's algorithm, the Digital Signature Algorithm (DSA), the Diffie-Hellman algorithm, and the Ephemeral Diffie-Hellman algorithm.

5. An apparatus as recited in claim 1, wherein:
the number of binary digits is a first number of binary digits;
the modulus is a first modulus;
a second modulus has a second number of binary digits;
the first circuit is further configured to determine, based on the second modulus and the integer, a third residue of the integer modulo the second modulus;
the second circuit is further configured to determine, based on the second modulus and the second number of binary digits, a fourth residue of two raised to the power of twice the second number of binary digits modulo the second modulus;
wherein at least a third portion of time during which the first circuit determines the third residue is the same as a fourth portion of time during which the second circuit determines the fourth residue; and
the third circuit is further configured to determine the cryptographic result based on the first residue, the second residue, the third residue, and the fourth residue.

6. An apparatus as recited in claim 5, wherein:
the first modulus is a first prime number;
the second modulus is the second prime number;
a third modulus is equal to the product of the first prime number and the second prime number;
the third modulus has a third number of binary digits;
the first residue is a first modular reduction of the integer, based on the first prime number;
the second residue is a second modular reduction of the integer, based on the second prime number;
the third residue is a first Montgomery constant;
the fourth residue is a second Montgomery constant;
a fourth circuit is configured to determine, based on the third modulus and the third number of binary digits, a fifth reside of two raised to the power of twice the third number of binary digits modulo the third modulus, wherein the fifth residue is a third Montgomery constant;
wherein both (a) the first portion of time during which the first circuit determines the first residue and (b) the third portion of time during which the first circuit determines the third residue are the same as a fifth portion of time during which the fourth circuit determines the fifth residue; and
wherein both (c) the second portion of time during which the second circuit determines the second residue and (b) the fourth portion of time during which the second circuit determines the fourth residue are the same as a sixth portion of time during which the fourth circuit determines the fifth residue; and the third circuit is further configured to determine the cryptographic result, based on Montgomery's method, the first modular reduction of the integer, the second modular reduction of the integer, the first Montgomery constant, the second Montgomery constant, and the third Montgomery constant.

7. An apparatus as recited in claim 1, wherein the first circuit is further configured to determine the first residue of the integer modulo the modulus without performing a division by the modulus and without consuming a number of processing cycles as great as the number of binary digits.

8. An apparatus as recited in claim 1, wherein the second circuit is further configured to determine the second residue by being configured to:
(a) initialize a data element with a value that represents two raised to the power of the number of binary digits;
(b) determine a difference by subtracting the modulus from the value in the data element;
(c) when the difference is not negative, shift the value in the data element toward more significant digits by one binary digit;
(d) repeat (b) and (c) until a number of times that step (b) is repeated is equal to the number of binary digits; and
wherein the second residue is equal to the value of the data element, after the number of times equals the number of binary digits.

9. An apparatus for cryptographic data processing, comprising:
means for causing, based on a modulus and an integer, a first processing means to determine a first residue of the integer modulo the modulus, wherein:
the modulus has a number of binary digits; and
the integer represents either plaintext or ciphertext
means for causing, based on the modulus and the number of binary digits, a second processing means to determine a second residue of two raised to the power of twice the number of binary digits modulo the modulus;
wherein at least a first portion of time during which the first processing means determines the first residue is the same as a second portion of time during which the second processing means determines the second residue; and
means for causing, based on the first residue and the second residue, a third processing means to determine a cryptographic result.

10. An apparatus as recited in claim 9, wherein:
the number of binary digits is a first number of binary digits;
the modulus is a first modulus;
a second modulus has a second number of binary digits; and
the apparatus further comprises:
means for causing, based on the second modulus and the second number of binary digits, a fourth processing means to determine a third residue of two raised to the power of twice the second number of binary digits modulo the second modulus;
wherein at least a third portion of time during which the first processing means determines the first residue is the same as a fourth portion of time during which the fourth processing means determines the third residue; and
wherein at least a fifth portion of time during which the second processing means determines the second residue is the same as a sixth portion of time during which the fourth processing means determines the third residue.

11. An apparatus as recited in claim 9, wherein:
the cryptographic result is either the plaintext or the ciphertext; and
the means for causing the third processing means to determine the cryptographic result further comprises means for causing the third processing means to determine the cryptographic result based on a public-key private-key pair.

12. An apparatus as recited in claim 9, wherein the means for causing the third processing means to determine the cryptographic result further comprises:
means for causing the third processing means to determine the cryptographic result based on an encryption algorithm selected from the group consisting of the Rivest, Shamir, and Adleman (RSA) algorithm, Barrett's algorithm, the Digital Signature Algorithm (DSA), the Diffie-Hellman algorithm, and the Ephemeral Diffie-Hellman algorithm.

13. An apparatus as recited in claim 9, wherein:
the number of binary digits is a first number of binary digits;
the modulus is a first modulus;
a second modulus has a second number of binary digits; and
the apparatus further comprises:
means for causing, based on the second modulus and the integer, the first processing means to determine a third residue of the integer modulo the second modulus;
means for causing, based on the second modulus and the second number of binary digits, the second processing means to determine a fourth residue of two raised to the power of twice the second number of binary digits modulo the second modulus;
wherein at least a third portion of time during which the first processing means determines the third residue is the same as a fourth portion of time during which the second processing means determines the fourth residue; and
the means for causing the third processing means to determine the cryptographic result, based on the first residue and the second residue, further comprises:
means for causing, based on the first residue, the second residue, the third residue, and the fourth residue, the third processing means to determine the cryptographic result.

14. An apparatus as recited in claim 13, wherein:
the first modulus is a first prime number;
the second modulus is the second prime number;
a third modulus is equal to the product of the first prime number and the second prime number;
the third modulus has a third number of binary digits;
the first residue is a first modular reduction of the integer, based on the first prime number;
the second residue is a second modular reduction of the integer, based on the second prime number;
the third residue is a first Montgomery constant;
the fourth residue is a second Montgomery constant;
the apparatus further comprises:
means for causing, based on the third modulus and the second number of binary digits, a fourth processing means to determine a fifth reside of two raised to the power of twice the third number of binary digits modulo the third modulus, wherein the fifth residue is a third Montgomery constant;
wherein both (a) the first portion of time during which the first processing means determines the first residue and (b) the third portion of time during which the first processing means determines the third residue are the same as a fifth portion of time during which the fourth processing means determines the fifth residue; and
wherein both (c) the second portion of time during which the second processing means determines the second residue and (b) the fourth portion of time during which the second processing means determines the fourth residue are the same as a sixth portion of time during which the fourth processing means determines the fifth residue; and
the means for causing the third processing means to determine the cryptographic result further comprises means for causing the third processing means to determine the cryptographic result, based on Montgomery's method, the first modular reduction of the integer, the second modular reduction of the integer, the first Montgomery constant, and the second Montgomery constant.

15. An apparatus as recited in claim 9, wherein the means for causing the first processing means to determine the first residue of the integer modulo the modulus further comprises:
means for causing the first processing means to determine the first residue of the integer modulo the modulus without performing a division by the modulus and without consuming a number of processing cycles as great as the number of binary digits.

16. An apparatus as recited in claim 9, wherein the means for causing the second processing means to determine the second residue further comprises:
(a) means for initializing a data element with a value that represents two raised to the power of the number of binary digits;
(b) means for determining a difference by subtracting the modulus from a value represented by the value in the data element;
(c) means for shifting, when the difference is not negative, the value in the data element toward more significant digits by one binary digit;
(d) means for repeating the means of (b) and (c) until a number of times that means (b) is repeated is equal to the number of binary digits; and
wherein the second residue is equal to the value of the data element, after the number of times equals the number of binary digits.

17. A computer-implemented method for cryptographic data processing, comprising the steps of:
based on a modulus and an integer, causing a first processing means to determine a first residue of the integer modulo the modulus, wherein:
the modulus has a number of binary digits; and
the integer represents either plaintext or ciphertext
based on the modulus and the number of binary digits, causing a second processing means to determine a second residue of two raised to the power of twice the number of binary digits modulo the modulus;
wherein at least a first portion of time during which the first processing means determines the first residue is the same as a second portion of time during which the second processing means determines the second residue; and
based on the first residue and the second residue, causing a third processing means to determine a cryptographic result.

18. A computer-implemented method as recited in claim 17, wherein:
the number of binary digits is a first number of binary digits;
the modulus is a first modulus;
a second modulus has a second number of binary digits; and
the computer-implemented method further comprises the step of:
based on the second modulus and the second number of binary digits, causing a fourth processing means to determine a third residue of two raised to the power of twice the second number of binary digits modulo the second modulus;
wherein at least a third portion of time during which the first processing means determines the first residue is the same as a fourth portion of time during which the fourth processing means determines the third residue; and
wherein at least a fifth portion of time during which the second processing means determines the second residue is the same as a sixth portion of time during which the fourth processing means determines the third residue.

19. A computer-implemented method as recited in claim 17, wherein:
the cryptographic result is either the plaintext or the ciphertext; and
causing the third processing means to determine the cryptographic result further comprises the step of causing the third processing means to determine the cryptographic result based on a public-key private-key pair.

20. A computer-implemented method as recited in claim 17, wherein causing the third processing means to determine the cryptographic result further comprises the step of:
causing the third processing means to determine the cryptographic result based on an encryption algorithm selected from the group consisting of the Rivest, Shamir, and Adleman (RSA) algorithm, Barrett's algorithm, the Digital Signature Algorithm (DSA), the Diffie-Hellman algorithm, and the Ephemeral Diffie-Hellman algorithm.

21. A computer-implemented method as recited in claim 17, wherein:
the number of binary digits is a first number of binary digits;
the modulus is a first modulus;
a second modulus has a second number of binary digits; and
the computer-implemented method further comprises the steps of:
based on the second modulus and the integer, causing the first processing means to determine a third residue of the integer modulo the second modulus;
based on the second modulus and the second number of binary digits, causing the second processing means to determine a fourth residue of two raised to the power of twice the second number of binary digits modulo the second modulus;
wherein at least a third portion of time during which the first processing means determines the third residue is the same as a fourth portion of time during which the second processing means determines the fourth residue; and
causing the third processing means to determine the cryptographic result, based on the first residue and the second residue, further comprises the step of:
based on the first residue, the second residue, the third residue, and the fourth residue, causing the third processing means to determine the cryptographic result.

22. A computer-implemented method as recited in claim 21, wherein:
the first modulus is a first prime number;
the second modulus is the second prime number;
a third modulus is equal to the product of the first prime number and the second prime number;
the third modulus has a third number of binary digits;
the first residue is a first modular reduction of the integer, based on the first prime number;
the second residue is a second modular reduction of the integer, based on the second prime number;
the third residue is a first Montgomery constant;
the fourth residue is a second Montgomery constant;
the computer-implemented method further comprises the step of:
based on the third modulus and the second number of binary digits, causing a fourth processing means to determine a fifth reside of two raised to the power of twice the third number of binary digits modulo the third modulus, wherein the fifth residue is a third Montgomery constant;
wherein both (a) the first portion of time during which the first processing means determines the first residue and (b) the third portion of time during which the first processing means determines the third residue are the same as a fifth portion of time during which the fourth processing means determines the fifth residue; and
wherein both (c) the second portion of time during which the second processing means determines the second residue and (b) the fourth portion of time during which the second processing means determines the fourth residue are the same as a sixth portion of time during which the fourth processing means determines the fifth residue; and
causing the third processing means to determine the cryptographic result further comprises causing the third processing means to determine the cryptographic result, based on Montgomery's method, the first modular reduction of the integer, the second modular reduction of the integer, the first Montgomery constant, and the second Montgomery constant.

23. A computer-implemented method as recited in claim 17, wherein causing the first processing means to determine the first residue of the integer modulo the modulus further comprises the step of:
causing the first processing means to determine the first residue of the integer modulo the modulus without performing a division by the modulus and without consuming a number of processing cycles as great as the number of binary digits.

24. A computer-implemented method as recited in claim 17, wherein causing the second processing means to determine the second residue further comprises the steps of:
(a) initializing a data element with a value that represents two raised to the power of the number of binary digits;
(b) determining a difference by subtracting the modulus from a value represented by the value in the data element;
(c) when the difference is not negative, shifting the value in the data element toward more significant digits by one binary digit;

(d) repeating computer-implemented steps (b) and (c) until a number of times that step (b) is repeated is equal to the number of binary digits; and wherein the second residue is equal to the value of the data element, after the number of times equals the number of binary digits.

25. A computer-readable storage medium carrying one or more sequences of instructions for cryptographic data processing, which instructions, when executed by one or more processors, cause the one or more processors to perform the steps of:

based on a modulus and an integer, causing a first processing means to determine a first residue of the integer modulo the modulus, wherein:

the modulus has a number of binary digits; and
the integer represents either plaintext or ciphertext based on the modulus and the number of binary digits, causing a second processing means to determine a second residue of two raised to the power of twice the number of binary digits modulo the modulus;

wherein at least a first portion of time during which the first processing means determines the first residue is the same as a second portion of time during which the second processing means determines the second residue; and based on the first residue and the second residue, causing a third processing means to determine a cryptographic result.

26. A computer-readable storage medium as recited in claim 25, wherein:

the number of binary digits is a first number of binary digits;
the modulus is a first modulus;
a second modulus has a second number of binary digits; and
the computer-readable storage medium further comprises instructions which, when executed by the one or more processors, cause the one or more processors to perform the step of:

based on the second modulus and the second number of binary digits, causing a fourth processing means to determine a third residue of two raised to the power of twice the second number of binary digits modulo the second modulus;

wherein at least a third portion of time during which the first processing means determines the first residue is the same as a fourth portion of time during which the fourth processing means determines the third residue; and wherein at least a fifth portion of time during which the second processing means determines the second residue is the same as a sixth portion of time during which the fourth processing means determines the third residue.

27. A computer-readable storage medium as recited in claim 25, wherein:

the cryptographic result is either the plaintext or the ciphertext; and the instructions for causing the third processing means to determine the cryptographic result further comprises instructions for performing the step of causing the third processing means to determine the cryptographic result based on a public-key private-key pair.

28. A computer-readable storage medium as recited in claim 25, wherein the instructions for causing the third processing means to determine the cryptographic result further comprises instructions for performing the step of:

causing the third processing means to determine the cryptographic result based on an encryption algorithm selected from the group consisting of the Rivest, Shamir, and Adleman (RSA) algorithm, Barrett's algorithm, the Digital Signature Algorithm (DSA), the Diffie-Hellman algorithm, and the Ephemeral Diffie-Hellman algorithm.

29. A computer-readable storage medium as recited in claim 25, wherein:

the number of binary digits is a first number of binary digits;
the modulus is a first modulus;
a second modulus has a second number of binary digits; and
the computer-readable storage medium further comprises instructions which, when executed by the one or more processors, cause the one or more processors to perform the step of:

based on the second modulus and the integer, causing the first processing means to determine a third residue of the integer modulo the second modulus;

based on the second modulus and the second number of binary digits, causing the second processing means to determine a fourth residue of two raised to the power of twice the second number of binary digits modulo the second modulus;

wherein at least a third portion of time during which the first processing means determines the third residue is the same as a fourth portion of time during which the second processing means determines the fourth residue; and the instructions for causing the third processing means to determine the cryptographic result, based on the first residue and the second residue, further comprises instructions for performing the step of:

based on the first residue, the second residue, the third residue, and the fourth residue, causing the third processing means to determine the cryptographic result.

30. A computer-readable storage medium as recited in claim 29, wherein:

the first modulus is a first prime number;
the second modulus is the second prime number;
a third modulus is equal to the product of the first prime number and the second prime number;
the third modulus has a third number of binary digits;
the first residue is a first modular reduction of the integer, based on the first prime number;
the second residue is a second modular reduction of the integer, based on the second prime number;
the third residue is a first Montgomery constant;
the fourth residue is a second Montgomery constant;
the computer-readable storage medium further comprises instructions which, when executed by the one or more processors, cause the one or more processors to perform the step of:

based on the third modulus and the second number of binary digits, causing a fourth processing means to determine a fifth reside of two raised to the power of twice the third number of binary digits modulo the third modulus, wherein the fifth residue is a third Montgomery constant;

wherein both (a) the first portion of time during which the first processing means determines the first residue and (b) the third portion of time during which the first processing means determines the third residue are the same as a fifth portion of time during which the fourth processing means determines the fifth residue; and wherein both (c) the second portion of time during which the second processing means determines the second residue and (b) the fourth portion of time during which the second processing means determines the fourth residue are the same as a sixth portion of time during which the fourth processing means determines the fifth residue; and the instructions for causing the third processing means to determine the cryptographic result further comprises instructions for performing the step of causing the third processing means to determine the cryptographic result, based on Montgomery's method, the first modular reduction of the integer, the second modular reduction of the integer, the first Montgomery constant, and the second Montgomery constant.

31. A computer-readable storage medium as recited in claim 25, wherein the instructions for causing the first processing means to determine the first residue of the integer modulo the modulus further comprises instructions for performing the step of:

causing the first processing means to determine the first residue of the integer modulo the modulus without performing a division by the modulus and without consuming a number of processing cycles as great as the number of binary digits.

32. A computer-readable storage medium as recited in claim 25, wherein the instructions for causing the second processing means to determine the second residue further comprises instructions for performing the steps of:

(a) initializing a data element with a value that represents two raised to the power of the number of binary digits;

(b) determining a difference by subtracting the modulus from a value represented by the value in the data element;

(c) when the difference is not negative, shifting the value in the data element toward more significant digits by one binary digit;

(d) repeating computer-implemented steps (b) and (c) until a number of times that step (b) is repeated is equal to the number of binary digits; and wherein the second residue is equal to the value of the data element, after the number of times equals the number of binary digits.

* * * * *